(12) United States Patent
Vaiman et al.

(10) Patent No.: US 12,732,017 B2
(45) Date of Patent: Sep. 8, 2026

(54) TOPOLOGY DETECTION IN AN ELECTRIC POWER DISTRIBUTION GRID

(71) Applicant: Commonwealth Edison Company, Chicago, IL (US)

(72) Inventors: Marianna Vaiman, Los Angeles, CA (US); Michael Vaiman, Los Angeles, CA (US); Shikhar Pandey, Oak Park, IL (US); Heng Chen, Oakbrook Terrace, IL (US); Farnoosh Rahmatian, West Vancouver (CA); Esa Aleksi Passo, Oakbrook Terrace, IL (US)

(73) Assignee: Commonwealth Edison Company, Chicago, IL (US)

( * ) Notice: Subject to any disclaimer, the term of this patent is extended or adjusted under 35 U.S.C. 154(b) by 702 days.

(21) Appl. No.: 18/077,217

(22) Filed: Dec. 7, 2022

(65) Prior Publication Data

US 2024/0195216 A1 Jun. 13, 2024

(51) Int. Cl.
*H02J 13/10* (2026.01)
*H02J 13/12* (2026.01)

(52) U.S. Cl.
CPC .............. *H02J 13/10* (2026.01); *H02J 13/12* (2026.01)

(58) Field of Classification Search
CPC ... Y02E 60/00; H02J 3/007; H02J 3/06; H02J 13/00002; H02J 13/00001; H02J 13/00007; H02J 3/001; Y04S 10/40; Y04S 10/30; G01R 19/2513; G01R 21/00; G05B 19/058
See application file for complete search history.

(56) References Cited

U.S. PATENT DOCUMENTS

| | | | | |
|---|---|---|---|---|
| 7,856,327 | B2 * | 12/2010 | Schweitzer, III | G01R 19/2513 715/734 |
| 9,287,713 | B2 * | 3/2016 | Sharon | H02J 13/00028 |
| 9,791,485 | B2 * | 10/2017 | Flammer, III | H04L 41/0896 |
| 11,183,879 | B1 * | 11/2021 | Barnett | H02J 3/38 |
| 2009/0125158 | A1 * | 5/2009 | Schweitzer, III | G01R 19/2513 700/297 |
| 2015/0253367 | A1 * | 9/2015 | Flammer, III | H04L 67/51 324/76.77 |
| 2021/0063985 | A1 * | 3/2021 | Nuqui | H02J 3/00 |

* cited by examiner

*Primary Examiner* — Darrin D Dunn
(74) *Attorney, Agent, or Firm* — Ballard Spahr LLP

(57) ABSTRACT

Technologies are provided for circuit topology detection in an electric power circuit. In some embodiments, a computing device can access phasor data associated with the electric power circuit including an arrangement of switching devices and multiple phasor measurement units. The computing device also can access threshold data defining individualized zero-current threshold values for respective ones of the multiple phasor measurement units. The computing device can determine one or more zero-current branches present in the arrangement of switching devices by applying the individualized zero-current thresholds to the accessed phasor data. The computing device can further determine, based on the one or more zero-current branches a circuit topology corresponding to the arrangement of switching devices.

20 Claims, 7 Drawing Sheets

TOPOLOGY DETECTION IN AN ELECTRIC POWER DISTRIBUTION GRID

SUMMARY

It is to be understood that both the following general description and the following detailed description are illustrative and explanatory only and are not restrictive.

In one embodiment, the disclosure provides a computer-implemented method. The computer-implemented method includes accessing phasor data associated with multiple phasor measurement units present in an electric circuit including an arrangement of switching devices and multiple phasor measurement units. The computer-implemented method also includes accessing threshold data defining individualized zero-current threshold values for respective ones of the multiple phasor measurement units. The computer-implemented method further includes determining one or more zero-current branches present in the arrangement of switching devices by applying the individualized zero-current thresholds to the phasor data. The computer-implemented method further includes determining, based on the one or more zero-current branches, a circuit topology corresponding to the arrangement of switching devices.

Additional elements or advantages of this disclosure will be set forth in part in the description which follows, and in part will be apparent from the description, or may be learned by practice of the subject disclosure. The advantages of the subject disclosure can be attained by means of the elements and combinations particularly pointed out in the appended claims.

This Summary is not intended to identify critical or essential features of the disclosure, but merely to summarize certain features and variations thereof. Other details and features will be described in the sections that follow. Further, both the foregoing general description and the following detailed description are illustrative and explanatory only and are not restrictive of the embodiments of this disclosure.

BRIEF DESCRIPTION OF THE DRAWINGS

The annexed drawings are an integral part of the disclosure and are incorporated into the subject specification. The drawings illustrate example embodiments of the disclosure and, in conjunction with the description and claims, serve to explain at least in part various principles, elements, or aspects of the disclosure. Embodiments of the disclosure are described more fully below with reference to the annexed drawings. However, various elements of the disclosure can be implemented in many different forms and should not be construed as limited to the implementations set forth herein. Like numbers refer to like elements throughout.

DETAILED DESCRIPTION

Figure 1:
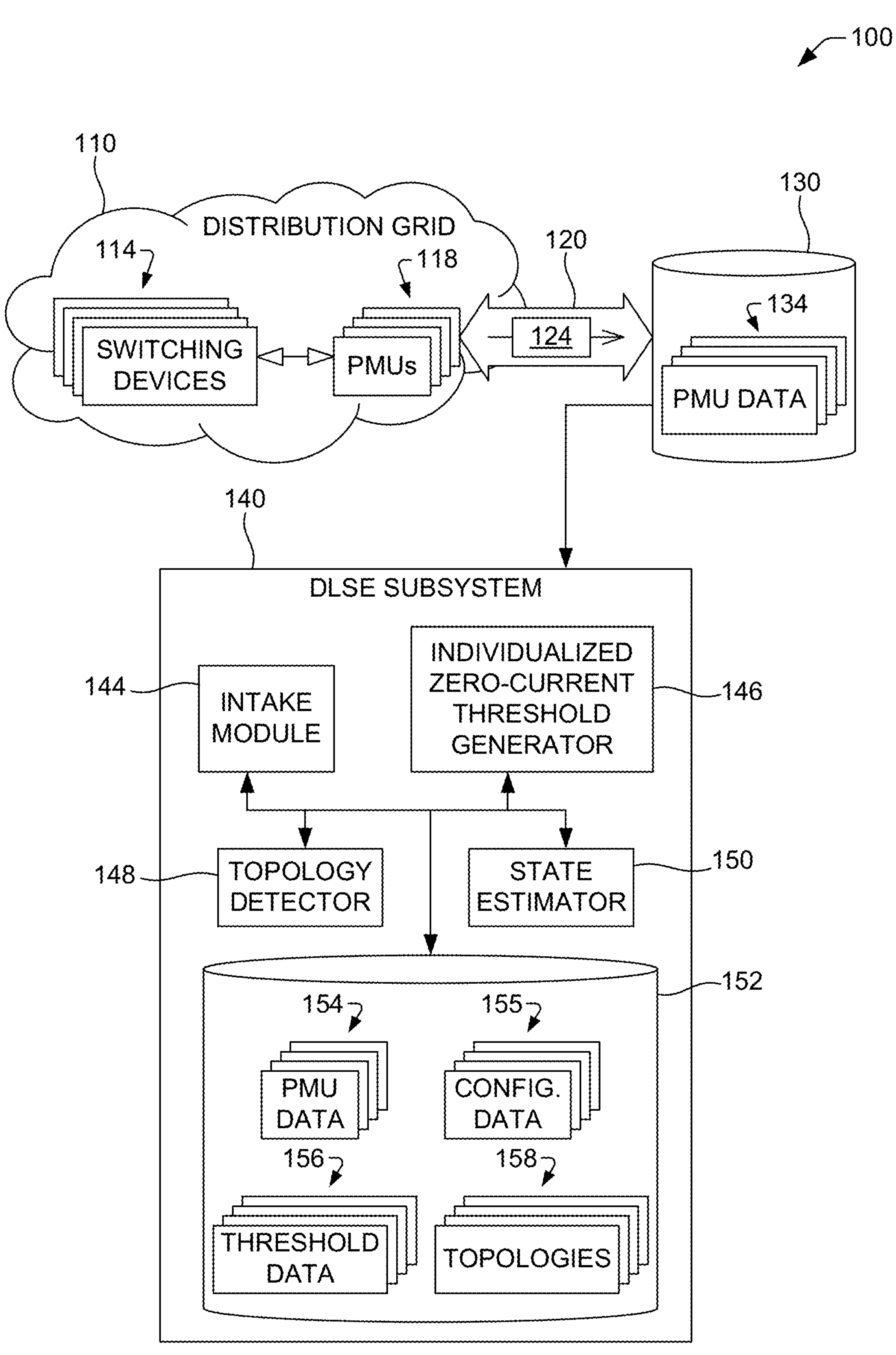
FIG. 1 illustrates an example of an operating environment, in accordance with one or more embodiments of this disclosure.

The disclosure recognizes and addresses, amongst other technical challenges, the issue of state estimation for an electric power distribution grid. Because the electric power distribution grid can be unbalanced, state estimation is commonly accomplished by 3-phase linear state estimation (LSE). Although the use of 3-phase LSE can provide practical accuracy at the distribution level, 3-phase LSE relies on status (e.g., open state or close state) of switching devices present in the electric power distribution grid. Yet, in contrast to power transmission grids, equipment and/or devices present in the electric power distribution grid may not be monitored. Thus, at a given time, it may be difficult to determine individual statuses of the switching devices.

Embodiments of this disclosure include computing devices, computer-implemented methods, and computer-program products that, individually or in combination, permit determining a circuit topology within in an electric power distribution grid by identifying zero-current branches based on measurements by phasor measurement units (PMUs). Circuit topology refers to a combination of open state(s) and close state(s) across switching devices deployed within an electric power circuit that constitutes the electric power distribution grid. As is described in greater detail below, embodiments of this disclosure, individually or in combination, permit estimating status of those switching devices based on phasor data associated with phasor measurement units (PMUs) coupled to the switching devices and use of individualized zero-current threshold values. In sharp contrast to existing technologies, instead of analyzing the phasor data with respect to a single zero-current threshold that is common across the PMUs, embodiments of this disclosure rely on individualized zero-current threshold values that are individualized for respective ones of the PMUs, and apply those individualized threshold values to the phasor data in order to determine which branches are deemed to have zero current. As a result, circuit topology can be detected. The individualized zero-current thresholds can be generated during a defined period prior to application of such threshold values to circuit topology detection. The phasor data can include field data indicative of voltage or current, or both, observed by the PMUs coupled to the switching devices. In other cases, the phasor data can be synthetic data arising from simulation of the electric power distribution grid and ascribed to the PMUs.

Embodiments of this disclosure provide several improvements over existing technologies. As a result of using individualized zero-current threshold values, for example, circuit topology can be detected more accurately than if the phasor data had been analyzed with respect to a single zero-current threshold that is common across the PMUs. This means that circuit topology can be detected more accurately based on phasor data from PMUs, without needing direct measurement and communication of switch status from an electric power distribution grid. Such an improvement permits more efficient utilization of resources because it avoids deploying infrastructure to collect individual switch statuses of switching devices deployed in the electric power distribution grid.

FIG. 1 illustrates an example of an operating environment 100, in accordance with one or more embodiments of this disclosure. The operating environment 100 includes a power distribution grid 110 including multiple switching devices 114 and multiple PMUs 118. The multiple switching devices 114 can include, for example, re-closers, breakers, switches, fuses, a combination thereof, or similar devices. The multiple PMUs 118 are electrically coupled to at least a subset of the switching devices 114. A PMU can be electrically coupled to a switching device by being deployed in a same power line as the switching device. Thus, a power line, or a section thereof, provides such an electric coupling. In one example, each one of the multiple PMUs 118 is coupled to respective ones of the multiple switching devices 114. Each switching device of the multiple switching devices 114 can transition between an open state and a close state. A transition between those states can be caused by an operational condition of the power distribution grid 110.

A combination of open states and close states across the multiple switching devices 114 defines a switching configuration of the power distribution grid 110. The switching configuration can be referred to as a circuit topology of the power distribution grid 110. Therefore, several switching configurations (circuit topologies) may be defined as respective combinations of switch states-open states and close states. For n switching devices constituting the multiple switching devices 114, a total number of switching configurations is $2^n$. Accordingly, the number of topologies in the power distribution grid 110 can be large, of the order thousand or tens of thousands, for example. Yet, the number of typically observed switching configurations in the field can be a small subset of that total number. For example, for n=10 switching devices, there are 1024 possible circuit topologies in the power distribution grid 110. Yet, the circuit topologies that may be expected in the field may be a few dozen, for example. Such expectation arises from various factors related to operation of the power distribution grid 110. An example factor is that there are switching configurations that have higher probability of occurrence. For instance, many switching devices, while necessary for emergencies and special cases, do get frequently exercised. Another example factor is that some switching configurations are simply more practical. For instance, some switching devices remain essentially constantly open and are used for backup during power outages or restorations. Thus, such switching devices may be seldom used during the operation of the power distribution grid 110. As yet another example, a subset of multiple switching devices 114 may be closed or opened collectively for practical reasons. Such collective switching results in some of the possible switching configuration not being realized. Further, switching that are expected to operate more often may be automated with remote control, and switching devices that are used exclusively for emergencies or for potential circuit optimization may be manually operated and seldom get exercised. In other words, most of the $2^n$ switching configurations are rarely realized over time.

Figure 2A:
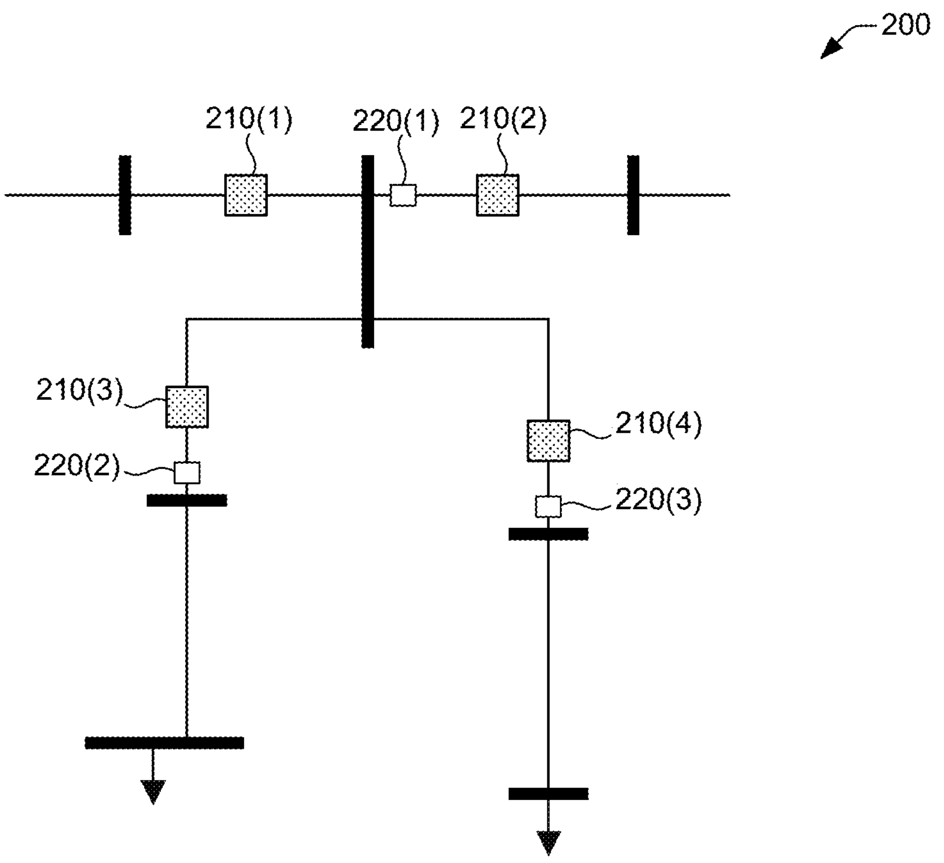
FIG. 2A illustrates an example of a section of a power distribution grid, in accordance with one or more embodiments of this disclosure.
Figure 2B:
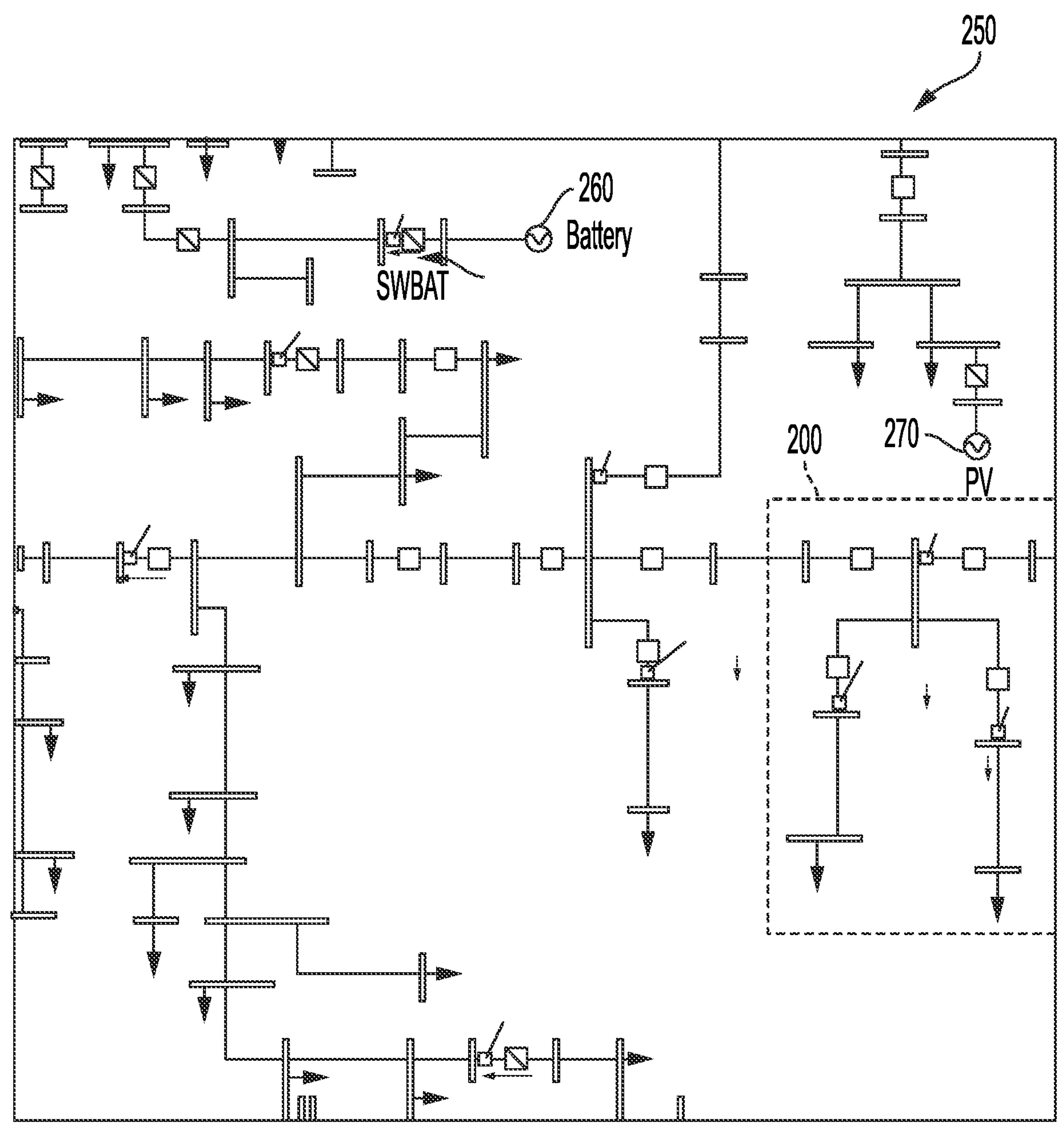
FIG. 2B illustrates an example of a section of a power distribution grid, in accordance with one or more embodiments of this disclosure.

The layout of the multiple switching devices 114 and the multiple PMUs 118 can be dictated by various factors, such as type of power distribution grid 110, equipment (DERs, for example) present in the power distribution grid 110, footprint of the power distribution grid 110, and similar factors. Simply as an illustration, FIG. 2A presents an example of a section 200 of the power distribution grid 110. Power buses in the section 200 are represented by solid bars. The section 200 has n=4 switching devices assembled in four branches, and various power buses (represented by solid bars). The four switching devices are represented by square hatched blocks, and include a first switching device 210(1), a second switching device 210(2), a third switching device 210(3), and a fourth switching device 210(4). Accordingly, $2^4$=16 switching configurations (circuit topologies) are possible. The section 200 also includes a first PMU 220(1), a second PMU 220(2), and a third PMU 220(3). Simply as another illustration, FIG. 2B presents an example of a microgrid 250 that can be part of the power distribution grid 110 (FIG. 1), in accordance with one or more embodiments of this disclosure. The microgrid 250 includes multiple switching devices (represented by square blocks) and distributed energy resources (DERs). The DERs include a battery 260 and photovoltaic (PV) equipment 270. The microgrid 250 includes the section 200 shown in FIG. 2A.

Each one of the multiple PMUs 118 measures amplitude and phase angle of either voltage or current, or both, on the power line connecting a switching device to a power bus (not depicted in FIG. 1). Accordingly, the multiple PMUs 118 can generate PMU data 124 that can be supplied, via a transport subsystem 120, to a data storage 130. The PMU data 124 can be referred to as field PMU data (or simply field data). The transport subsystem 120 can include wireline links, wireless links, router devices, server devices, a combination thereof, or similar devices that can send the PMU data 124 to the data storage 130. The PMU data 124 can be sent according to one of several communication protocols. The PMU data 124 can be retained in one or more data structures 134 (referred to as PMU data 134). The PMU data 134, in some cases, also may contain other PMU data (historical PMU data and/or contemporaneous PMU data).

The intake module 144 can access, over a data accumulation period, at least a portion of the PMU data within the PMU data 134. The data accumulation period defines a time interval during which observations from the multiple PMUs 118 are collected and analyzed. The intake module 144 can then send the accessed PMU data to an individualized zero-current threshold generation module 146 (which also may be referred to as zero-current threshold generator 146). The individualized zero-current threshold generator 146 can use PMU data from the intake module 144 and can operate on the received PMU data to determine individualized zero-current threshold values that are individualized for respective ones of the multiple PMUs 118. More specifically, the individualized zero-current threshold generator 146 can determine, using the received PMU data, a maximum value of current amplitude on open state for a switching device corresponding to each PMU of the multiple PMUs 118. In addition, the zero-current threshold generator 146 also can determine, using the received PMU data, a minimum value of current amplitude on close state of a switching device corresponding to each PMU of the multiple PMUs. For each switching device of the multiple switching devices 114, in some cases, the value of current amplitude through an open switch and through a closed switch are comparable. Thus, a single zero-current threshold that is common to all PMUs 118 cannot be used.

Determining such maximum and minimum values can result in the individualized zero-current threshold generator 146 retaining various configuration information associated with the multiple PMUs. The configuration information can be retained in one or multiple data structures 155 (referred to as configuration data 155) within one or multiple memory devices 152 (which can be referred to as repository 152). In some example scenarios, the individualized zero-current threshold generator 146 can retain switch PMU name, which is the name of a PMU associated with (e.g., near) a switching device having a maximum value of current amplitude in an open state or a minimum value of current amplitude in a close state. The name of the PMU is defined in a PMU mapping file containing a PMU mapping. The PMU mapping file can be one of the data structure(s) 155. The PMU mapping can associate a PMU signal to a location in a model or representation of the power distribution grid 110 or a portion thereof. In addition, the individualized zero-current threshold generator 146 also can retain maximum value of current amplitude on an open switching device among all the PMU datasets; configuration metadata identifying the name of PMU data file where the maximum value of current amplitude on the open switching device was present; minimum value of current amplitude on a closed switching device among all the PMU datasets; and configuration metadata identifying the name of PMU data file where the minimum value of current amplitude on the closed switching device was present.

The individualized zero-current threshold generator 146 can determine, based on the maximum values of current in open state and the minimum values of current in close state, individualized zero-current threshold values for respective PMUs. Hence, an individualized zero-current threshold value can be determined for each PMU of the multiple PMUs 118. Thus, each individualized zero-current threshold value that is determined is specific to a respective PMU of the multiple PMUs. Such a determination sharply contrasts with existing technologies, where a single, common (or global) zero-current threshold value is assigned to each PMU present in an electric power circuit. An individualized zero-current threshold also can be referred to as a customized zero-current threshold value.

An individualized zero-current threshold value for a PMU can be greater than the maximum value of current amplitude in open state and less than the minimum value of current amplitude in close state associated with the PMU. In some cases, the individualized zero-current threshold value for the PMU can be based on heuristics and/or empirical criteria. In other cases, the individualized zero-current threshold value for the PMU can be determined using a single-valued function that has the maximum current value in open state and the minimum current value in close state as arguments. That result value can be assigned to the individualized zero-current threshold value for the PMU. The zero-current threshold generator 146 can apply that single-valued function to determine an individualized zero-current threshold value for each PMU of the multiple PMUs 118.

The individualized zero-current threshold generator 146 can retain a respective individualized zero-current threshold value for each PMU of the multiple PMUs 118 in one or more data structures 156 (referred to as threshold data 156) within the repository 152. In addition, or in some cases, the individualized zero-current threshold generator 146 can retain the individualized zero-current threshold values within a PMU mapping file corresponding to the multiple PMUs 118. For example, the zero-current threshold generator 146 can update the PMU mapping file by adding a respective individualized zero-current threshold value for each PMU identified in the PMU mapping file.

By determining individualized zero-current threshold values for each PMU of the multiple PMUs 118, the DLSE subsystem 140 can overcome the limitations of commonplace approaches that use a common zero-current threshold value across the multiple PMUs 118. Indeed, by using individualized zero-current thresholds, the DLSE subsystem 140 can overcome the issue of misrepresenting a status of a switching device (open state or close state) in response to a PMU measuring low current for a circuit branch containing the switching device. Misrepresentation of the status of a switching device in cases where low current is measured by a PMU can arise from a zero-current branch actually carrying a small current. Such misrepresentation also can arise from operational situations having low load/consumption that results in a small current without the circuit branch being open, where the circuit branch incorporates the switching device.

The DLSE subsystem 140 can determine a circuit topology using individualized zero-current threshold values that become available after the accumulation period has elapsed. To that end, the intake module 144 can receive the PMU data 124 available at a time after the accumulation period has elapsed. Additionally, the DLSE subsystem 140 also can include a topology detection module 148 (which can be referred to as topology detector 148) that can determine, using the individualized zero-current threshold values, a circuit topology at the time after the accumulation period has elapsed. More specifically, the topology detector 148 can parse the PMU data 124 available at the time after the accumulation period has elapsed. By parsing such PMU data 124, the topology detector 148 can determine values of current observed by respective ones of the multiple PMUs 118. The topology detector 148 can individually compare those values of current to individualized zero-current threshold values for respective ones of the multiple PMUs 118. Such comparisons collectively yield a collection of states (open state or close state) for the multiple switching devices 114 coupled to the multiple PMUs 118. Specifically, for a first PMU that measures a value of current amplitude greater than the individualized zero-current threshold pertaining to the first PMU, a switching device coupled to the first PMU is deemed to be in a close state. Further, for a second PMU that measures a value of current amplitude less than or equal to the individualized zero-current threshold pertaining to the second PMU, a switching device coupled to the second PMU is deemed to be in an open state. Accordingly, the collection of states generated by the topology detector 148 represent a circuit topology at the time after the accumulation period has elapsed.

After the topology detector 148 has determined a circuit topology, a state estimation module 150 (which can be referred to as state estimator 150) can determine a state of the power distribution grid 110 by solving a 3-phase LSE problem using the determined circuit topology.

Figure 3:
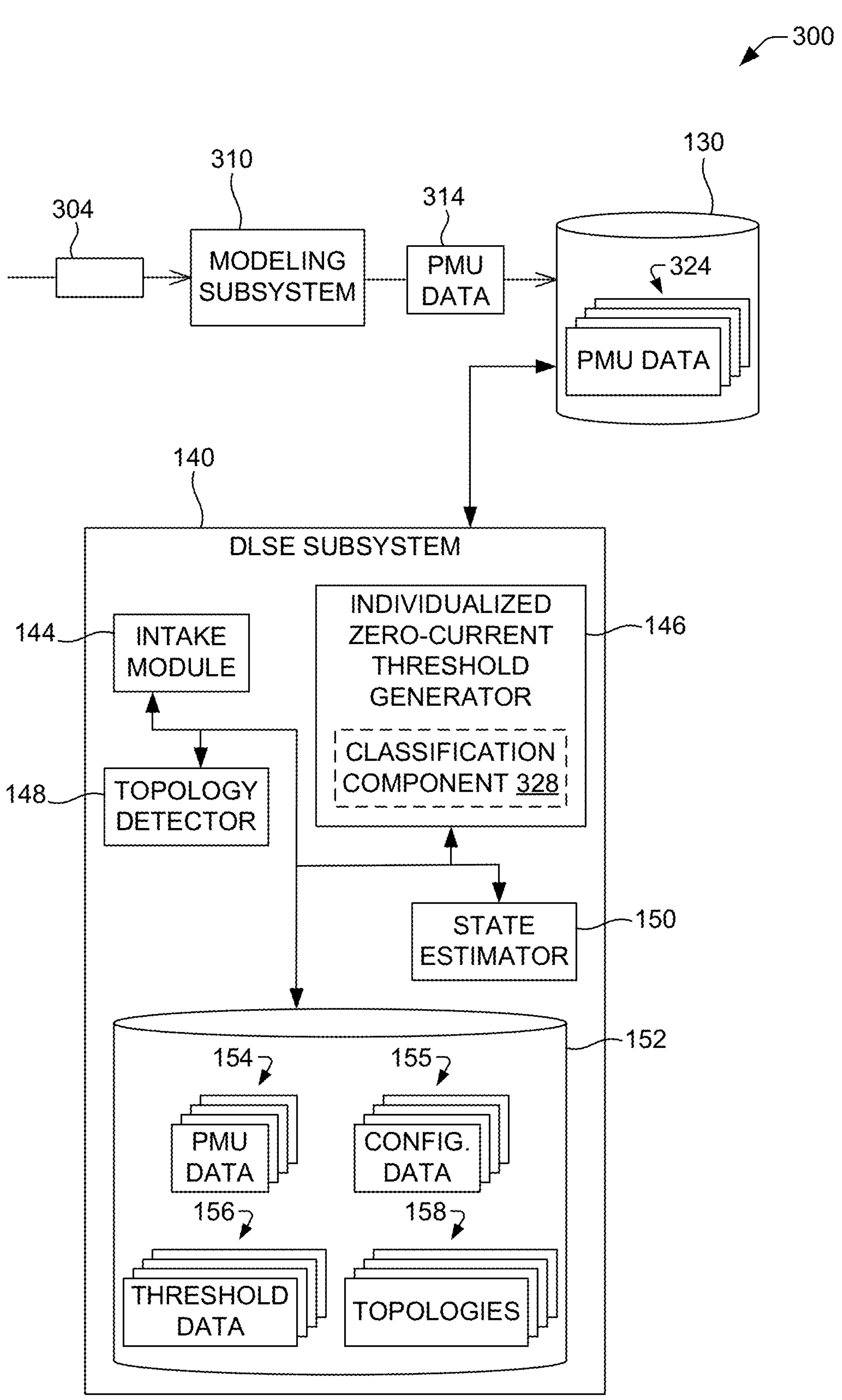
FIG. 3 illustrates an example of a computing system, in accordance with one or more embodiments of this disclosure.

In some embodiments, as is shown in FIG. 3, instead of using field data, the DLSE subsystem 140 can use synthetic PMU data (also referred to as synthetic data) to determine individualized zero-current threshold values for respective ones of the multiple PMUs 118. To that end, the DLSE subsystem 140 can be part of a computing system 300 that includes a modeling subsystem 310. The modeling subsystem 310 can perform a simulation of the time-dependent operation of the power distribution grid 110 (FIG. 1). As an example, the modeling subsystem 310 can include a real-time digital simulator (RTDS) that can perform, at least partially, such a simulation. Performing the simulation can include determining phasor data indicative of current (e.g., current amplitudes and current phase angles) circulating across the multiple switching devices 114 (FIG. 1). The simulation can model operation of the power distribution grid 110 over a defined period of time or in essentially real-time. Thus, such complex values of current can be time-dependent.

To perform such a simulation, the modeling subsystem 310 can receive configuration data 304 indicative of a PMU mapping that identifies the arrangement of the multiple PMUs 118 within the power distribution grid 110. In some cases, based on the simulation being performed, the PMU mapping can identify a subset of the multiple PMUs 118 corresponding to a portion of the power distribution grid 110. The configuration data 304 can be retained in a configuration resource that can be accessed by the modeling subsystem 310. The configuration resource can be embodied in, for example, a configuration file (e.g., a PMU mapping file), a database, or similar resource. In some cases, the configuration resource can be retained in the repository 152.

By performing such a simulation, the modeling subsystem 310 can generate PMU data 314. The PMU data 314 includes synthetic data and can be retained within one or multiple data structures 324 (referred to as PMU data 324). The PMU data 324, in some cases, also may contain PMU data generated via other simulations of the operation of the power distribution grid 110 and/or other power distribution grid(s).

The intake module 144 can access at least a portion of the PMU data within the PMU data 324. The intake module 144 can then pass the accessed PMU data to the individualized zero-current threshold generator 146. The individualized zero-current threshold generator 146 can use PMU data from the intake module 144 and can operate on the received PMU data to determine individualized zero-current threshold values for respective ones of the multiple PMUs 118, in accordance with one or more aspects described herein. Hence, an individualized zero-current threshold value can be determined for each PMU of the multiple PMUs 118.

In addition, or in some embodiments, individualized zero-current threshold values can be determined based on other types of PMU data instead of historical field data or synthetic data arising from simulations of the operation of the power distribution grid 110 (FIG. 1).

As is described herein, the intake module 144 can then access at least a portion of the PMU data 324, and can send the accessed PMU data to the individualized zero-current threshold generator 146. The zero-current threshold generator 146 can determine individualized zero-current threshold values that are individualized for respective ones of the multiple PMUs 118. It is noted that such zero-current threshold values are determined offline; that is, at a time different from another time during which the topology detector 148 can determine, in real-time in some cases, a circuit topology. Such an offline determination can permit generating data and configuration files, in addition to the zero-current threshold values, that can be used for topology detection.

Figure 4:
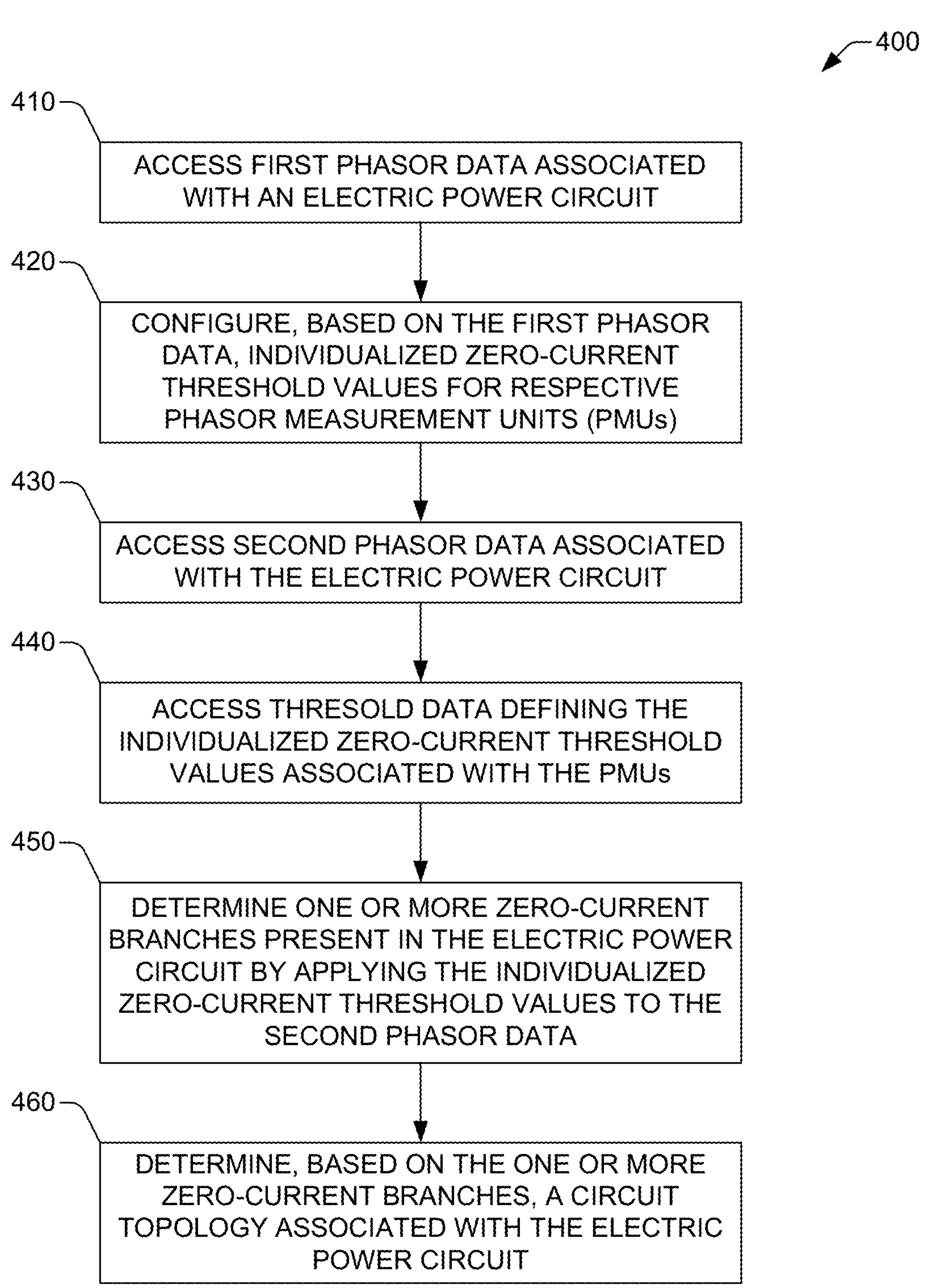
FIG. 4 illustrates an example of a method, in accordance with one or more embodiments of this disclosure.
Figure 5:
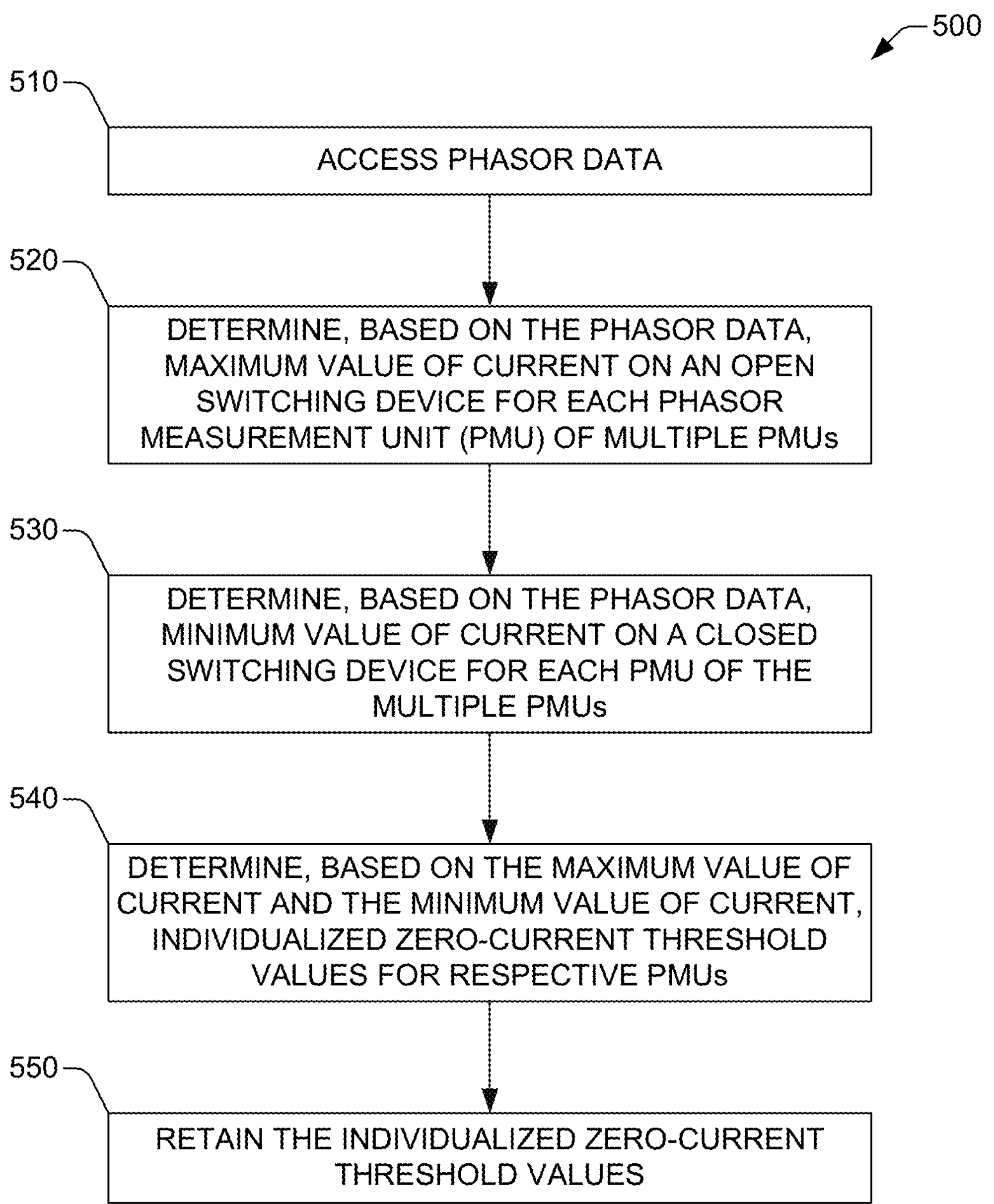
FIG. 5 illustrates an example of a method, in accordance with one or more embodiments of this disclosure.

In view of the aspects described herein, example methods that may be implemented in accordance with the disclosure can be better appreciated with reference, for example, to the flowcharts in FIGS. 4-5. For the sake of simplicity of explanation, the example methods disclosed herein are presented and described as a series of blocks (with each block representing an action or an operation in a method, for example). However, the example methods are not limited by the order of blocks and associated actions or operations, as some blocks may occur in different orders and/or concurrently with other blocks from those that are shown and described herein. Further, not all illustrated blocks, and associated action(s), may be required to implement an example method in accordance with one or more aspects of the disclosure. Two or more of the example methods (and any other methods disclosed herein) may be implemented in combination with each other. It is noted that the example methods (and any other methods disclosed herein) may be alternatively represented as a series of interrelated states or events, such as in a state diagram.

FIG. 4 illustrates a flowchart of an example method 400 for determining, using PMU data, circuit topology in a distribution power grid, in accordance with one or more embodiments of this disclosure. A computing device or a system of computing devices may implement the example method 400 in its entirety or in part. To that end, each one of the computing devices includes computing resources that may implement at least one of the blocks included in the example method 400. The computing resources comprise, for example, central processing units (CPUs), graphics processing units (GPUs), tensor processing units (TPUs), memory, disk space, incoming bandwidth, and/or outgoing bandwidth, interface(s) (such as I/O interfaces or APIs, or both); controller devices(s); power supplies; a combination of the foregoing; and/or similar resources. In one example, each one of the computing devices may include programming interface(s); an operating system; software for configuration and/or control of a virtualized environment; firmware; and similar resources.

At block 410, the computing device can access or otherwise obtain first phasor data associated with an electric power circuit. The first phasor data can include first data indicative of current amplitude and current phase angle for multiple switching devices; second data indicative of voltage amplitude and voltage phase angle for the multiple switching devices; or a combination of the first data and the second data. The first phasor data can be accessed or otherwise obtained during a defined time interval. The defined time interval can correspond to a defined period of operation of the electric power circuit. In some cases, the defined period of operation can be measured in wall-clock time and the phasor data can be field phasor data (e.g. field PMU data 124 (FIG. 1). In other cases, the defined period can be simulated time, and the phasor data can be data arising from a computer simulation of the operation of the power electric circuit. That data can include PMU data 324 (FIG. 3), for example. The electric power circuit can form part of a power distribution grid and can include an arrangement of switching devices. The electric power circuit also can include multiple PMUs coupled to at least a subset of the switching devices. As such, a first PMU of the multiple PMUs is coupled to a first switching device of the subset of the switching devices, and a second PMU of the multiple PMUs is coupled with a second switching device of the switching devices. As is described herein, a PMU can be coupled to a switching device by being deployed in a same power line as the switching device. In one example, the power distribution grid can be the power distribution grid 110 and the switching devices can include the multiple switching devices 114 (FIG. 1).

At block 420, the computing device can configure, based on the first phasor data, individualized zero-current threshold values for respective ones of the multiple PMUs within the electric power circuit. Each individualized zero-current threshold values is thus specific to a respective PMU. The individualized zero-current thresholds can be configured by implementing the example method shown in FIG. 5 and described hereinafter.

At block 430, the computing device can access second phasor data associated with the electric power circuit. The second phasor data can include first data indicative of current amplitude and current phase angle for multiple switching devices; second data indicative of voltage amplitude and voltage phase angle for the multiple switching devices; or a combination of the first data and the second data. In some cases, the phasor data can be field PMU data generated by multiple PMUs assembled in the power distribution grid. The second phasor data can be available after the first phasor data. That is, the first phasor data can be historical phasor data relative to the second phasor data.

At block 440, the computing device can access threshold data defining individualized zero-current threshold values associated with the multiple PMUs. The individualized zero-current threshold values correspond to respective ones of the multiple PMUs. That is, each individualized zero-current threshold value is specific to a respective PMU of the multiple PMUs.

At block 450, the computing device can more accurately determine, based on the second phasor data, one or more zero-current branches present in the electric power circuit by applying the individualized threshold values to the phasor data. The one or more zero-current branches can be present in the arrangement of switching devices. Applying the individualized zero-current threshold values to the phasor data can include comparing a current amplitude at a first PMU of the multiple PMU to a first individualized zero-current value corresponding to the first PMU. In some cases, such a comparison is indicative of the current amplitude being less than the first individualized zero-current threshold value, and as a result, the computing device can determine that the power in which the first PMU is deployed is a zero-current branch.

At block 460, the computing device can determine, based on the one or more zero-current branches determined using the individualized threshold values, a circuit topology associated with the electric power circuit. The circuit topology corresponds to the arrangement of switching devices.

Block 410 and block 420 can form a first stage where each PMU in the electric power circuit is assigned a respective zero-current threshold value customized to the PMU. Block 430, block 440, block 450, and block 460 can form a second stage where the individualized zero-current threshold values can be applied to circuit topology detection in the electric power circuit. Although the example method 400 is described as being performed by a single computing device, the disclosure is not limited in that respect. In some cases, a first computing device can implement block 410 and block 420, and a second computing device can implement block 430, block 440, block 450, and block 460.

FIG. 5 illustrates a flowchart of an example method 500 for determining individualized zero-current threshold values for respective PMUs in a distribution power grid, in accordance with one or more embodiments of this disclosure. A computing device or a system of computing devices may implement the example method 500 in its entirety or in part. To that end, each one of the computing devices includes computing resources that may implement at least one of the blocks included in the example method 500. The computing resources comprise, for example, CPUs, GPUs, TPUs, memory, disk space, incoming bandwidth, and/or outgoing bandwidth, interface(s) (such as I/O interfaces or APIs, or both); controller devices(s); power supplies; a combination of the foregoing; and/or similar resources. In one example, each one of the computing devices may include programming interface(s); an operating system; software for configuration and/or control of a virtualized environment; firmware; and similar resources.

The computing device or the system of computing devices can host the intake module 144 (FIG. 1) and the zero-current threshold generator 146 (FIG. 1), amongst other software modules. The computing device can implement the example method 500 by executing one or multiple instances of the intake module 144 and the individualized zero-current threshold generator 146, for example. Thus, the intake module 144 and the individualized zero-current threshold generator 146 (FIG. 1), individually or in combination, can perform the operations corresponding to the blocks, individually or in combination, of the example method 500.

At block 510, the computing device can access phasor data (e.g., PMU data 134 (FIG. 1) or PMU data 324 (FIG. 3)). The phasor data can include first data indicative of current amplitude and current phase angle for multiple switching devices; second data indicative of voltage amplitude and voltage phase angle for the multiple switching devices; or a combination of the first data and the second data. In some cases, the phasor data can be field PMU data generated by multiple PMUs assembled in a power distribution grid. For example, the power distribution grid can be the power distribution grid 110 (FIG. 1), the multiple PMUs can include the multiple PMUs 118 (FIG. 1), and the multiple switching devices can include the multiple switching devices 114 (FIG. 1). In other cases, the phasor data can be synthetic data generated by a subsystem (e.g., modeling subsystem 310 (FIG. 3)) that can simulate time-dependent operation of the power distribution grid. In one example, the subsystem can include an RTDS that can generate the synthetic data.

Regardless of the type of phasor data-field data or synthetic data-a PMU mapping can identify the arrangement of the multiple PMUs within the power distribution grid. Thus, as mentioned, the PMU mapping can associate a PMU signal to a location in the distribution grid model. Configuration data indicative of the PMU mapping can be retained in a configuration resource, such as a configuration file (e.g., a PMU mapping file), a database, or similar resource. Additionally, the phasor data can include multiple PMU datasets for respective PMUs of the multiple PMUs. As such, a first PMU dataset of the multiple PMU datasets contains data corresponding to a first PMU of the multiple PMUs, a second PMU dataset of the multiple PMU datasets contains data corresponding to a second PMU of the multiple PMUs, and so forth. The multiple PMU datasets can include historical PMU data sets.

At block 520, the computing device can determine, using the phasor data, a maximum value of current on an open switching device for each PMU of the multiple PMUs. At block 530, the computing device can determine, using the phasor data, a minimum value of current on a closed switching device corresponding to each PMU of the multiple PMUs.

In addition, while not depicted in FIG. 5, determining such maximum and minimum values can result in the computing device retaining various information associated with the multiple PMUs. The information can be retained in one or multiple memory devices (e.g., repository 152 (FIG. 1)). In one example scenario, the computing device can retain switch PMU name, which is the name of a PMU associated with (e.g., near) a switching device having a maximum value of current in open state or a minimum value of current in close state. The name of the PMU can be defined in a PMU mapping file containing the PMU mapping. In addition, the computing device also can retain maximum value of current on an open switching device among all the PMU datasets; configuration metadata identifying the name of PMU data file where the maximum value of current on the open switching device was present; minimum value on a closed switching device among all the PMU datasets; and configuration metadata identifying the name of PMU data file where the minimum value of current on the closed switching device was present.

At block 540, the computing device can determine, based on the maximum value of current in open state and the minimum value of current in close state, individualized zero-current threshold values for respective PMUs. As a result, an individualized zero-current threshold value can be determined for each PMU of the multiple PMUs. As is described herein, in some cases, the individualized zero-current threshold value for a PMU can be determined using a single-valued function that has the maximum current value in open state and the minimum current value in close state as arguments, and yields a value that is greater than the maximum current value in open state and less than the minimum current value in close state. That resulting value is the individualized zero-current threshold value for the PMU.

At block 550, the computing device can retain the individualized zero-current threshold values for each PMU of the multiple PMUs. In some cases, retaining the individualized zero-current threshold values can include updating the PMU mapping file retained in a memory device by adding a respective individualized zero-current threshold value for each PMU identified in the PMU mapping file. In other cases, retaining the individualized zero-current thresholds values can include retaining the individualized zero-current threshold values and data identifying respective PMUs in a data structure (e.g., a file, a table in database, or similar structure) within one or multiple memory devices (e.g., the repository 152 (FIG. 1)). The individualized zero-current threshold values can be applied to more accurately determining one or more zero-current branches, which branch(es) can be used to determine a circuit topology for a group of multiple switching devices assembled in a power distribution grid containing the multiple PMUs. For example, as is described herein, the individualized zero-current threshold values can be applied at block 450 of the example method 400 (FIG. 4).

Figure 6:
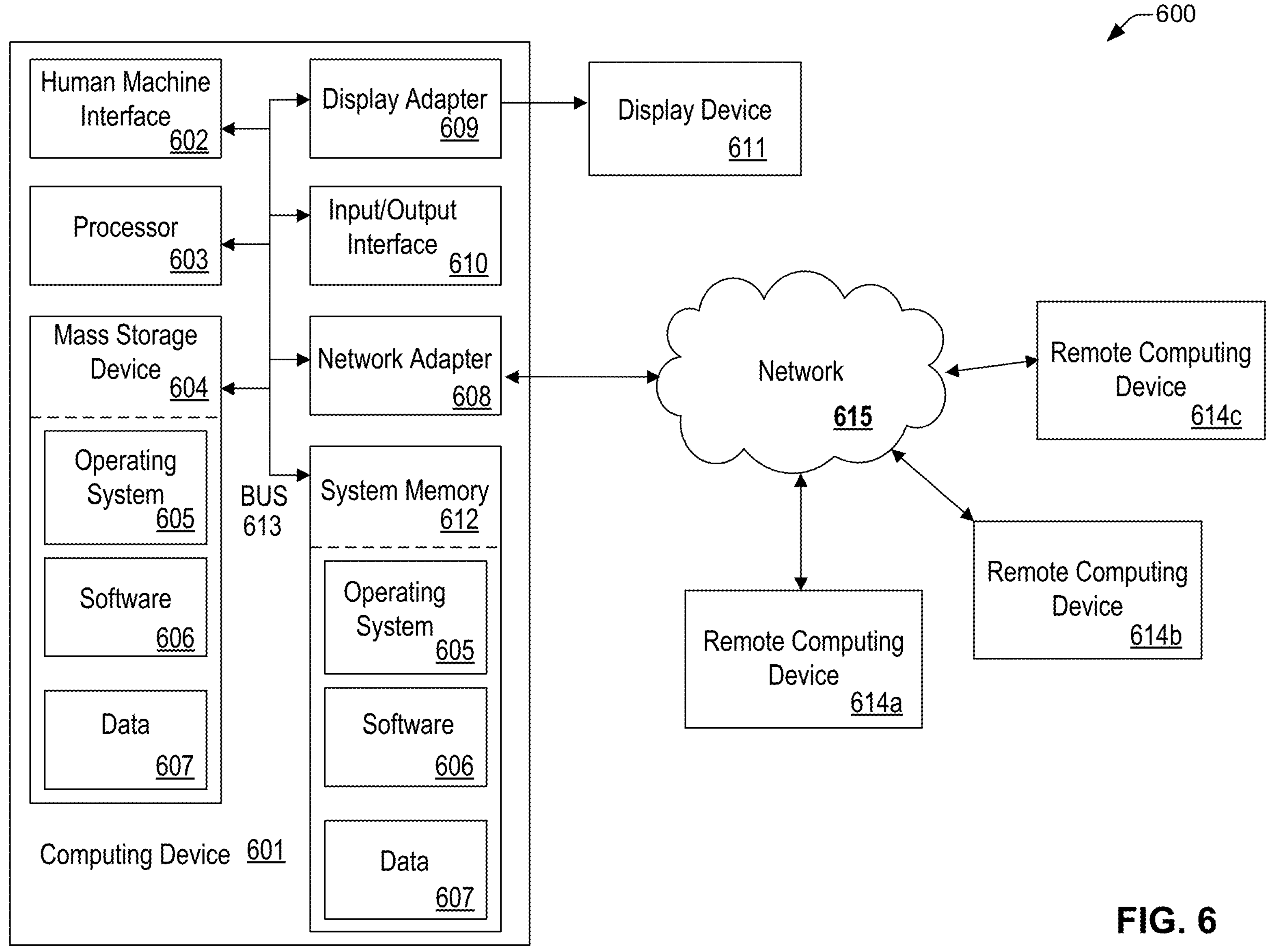
FIG. 6 illustrates an example of a computing system, in accordance with one or more embodiments of this disclosure.

In order to provide some context, the computer-implemented methods and systems of this disclosure can be implemented on the computing environment illustrated in FIG. 6 and described below. Similarly, the computer-implemented methods and systems disclosed herein can utilize one or more computers to perform one or more functions in one or more locations. FIG. 6 is a block diagram illustrating an example of a computing system 600 for performing the disclosed methods and/or implementing the disclosed systems. The computing system 600 shown in FIG. 6 is only an example of an operating environment and is not intended to suggest any limitation as to the scope of use or functionality of operating environment architecture. Neither should the operating environment be interpreted as having any dependency or requirement relating to any one or combination of components illustrated in the exemplary operating environment. The computing system 600 can be functionally coupled to the power distribution grid 110 (FIG. 1) (via a network 615, for example) and can embody a portion of the operating environment 100 (FIG. 1). In addition, or in other cases, the computing system 600 can embody the computing system 300 (FIG. 3).

The computer-implemented methods and systems in accordance with this disclosure can be operational with numerous other general purpose or special purpose computing system environments or configurations. Examples of well-known computing systems, environments, and/or configurations that can be suitable for use with the systems and methods comprise, but are not limited to, personal computers, server computers, laptop devices, table computers, and multiprocessor systems. Additional examples comprise set-top boxes, programmable consumer electronics, network PCs, minicomputers, mainframe computers, distributed computing environments that comprise any of the above systems or devices, and the like.

The processing of the disclosed computer-implemented methods and systems can be performed by software components. The software components can include one or a combination of the intake module 144 (FIG. 1), the individualized zero-current threshold generator 146 (FIG. 1 or FIG. 3), the topology detector 148, and the state estimator 150. The disclosed systems and computer-implemented methods can be described in the general context of computer-executable instructions, such as program modules, being executed by one or more computers or other devices. Generally, program modules comprise computer code, routines, programs, objects, components, data structures, etc. that perform particular tasks or implement particular abstract data types. The disclosed methods can also be practiced in grid-based and distributed computing environments where tasks are performed by remote processing devices that are linked through a communications network. In a distributed computing environment, program modules can be located in both local and remote computer storage media including memory storage devices.

Further, one skilled in the art will appreciate that the systems and computer-implemented methods disclosed herein can be implemented via a general-purpose computing device in the form of a computing device 601. The components of the computing device 601 can comprise one or more processors 603, a system memory 612, and a system bus 613 that couples various system components including the one or more processors 603 to the system memory 612. The system can utilize parallel computing.

The system bus 613 represents one or more of several possible types of bus structures, including a memory bus or memory controller, a peripheral bus, an accelerated graphics port, or local bus using any of a variety of bus architectures. The bus 613, and all buses specified in this description can also be implemented over a wired or wireless network connection and each of the subsystems, including the one or more processors 603, a mass storage device 604, an operating system 605, software 606, data 607, a network adapter 608, the system memory 612, an Input/Output Interface 610, a display adapter 609, a display device 611, and a human-machine interface 602, can be contained within one or more remote computing devices 614*a,b,c* at physically separate locations, connected through buses of this form, in effect implementing a fully distributed system. The software 606 can include, in some cases, one or a combination of the intake module 144 (FIG. 1), the individualized zero-current threshold generator 146 (FIG. 1 or FIG. 3), the topology detector 148, and the state estimator 150. In some cases, the computing device 601 can embody, or can include, the DLSE subsystem 140 (FIG. 1 or FIG. 3). In other cases, the computing device 601 or a combination of the computing device 601 and at least one of remote computing devices 614*a,b,c* can embody, or can include, the DLSE subsystem 140 (FIG. 1 or FIG. 3) and the modeling subsystem 310 (FIG. 3). Memory device(s) within one or more of the computing device 601 or the remote computing devices 614*a,b,c* can embody, or can include, the data storage 130 (FIG. 1 or FIG. 3).

The computing device 601 typically comprises a variety of computer-readable media. Exemplary readable media can be any available media that is accessible by the computing device 601 and comprises, for example and not meant to be limiting, both volatile and non-volatile media, removable and non-removable media. The system memory 612 comprises computer readable media in the form of volatile memory, such as random access memory (RAM), and/or non-volatile memory, such as read only memory (ROM). The system memory 612 typically contains data such as the data 607 and/or program modules such as the operating system 605 and the software 606 that are immediately accessible to and/or are presently operated on by the one or more processors 603.

In another aspect, the computing device 601 can also comprise other removable/non-removable, volatile/non-volatile computer storage media. By way of example, FIG. 6 illustrates the mass storage device 604 which can provide non-volatile storage of computer code, computer readable instructions, data structures, program modules, and other data for the computing device 601. For example and not meant to be limiting, the mass storage device 604 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 804, including by way of example, the operating system 605 and the software 606. Each of the operating system 605 and the software 606 (or some combination thereof) can comprise elements of the programming and the software 606. The data 607 can also be stored on the mass storage device 604. The data 607 can be stored in any of one or more databases known in the art. Examples of such databases comprise, DB2®, Microsoft® Access, Microsoft® SQL Server, Oracle®, mySQL, PostgreSQL, and the like. The databases can be centralized or distributed across multiple systems. In some embodiments, the PMU data 154, the configuration data 155, the threshold data 156, and the topologies 158 can be retained in the mass storage device 604 and/or the system memory 612, as part of data 607, for example. In addition, or in other embodiments, the data 607 and/or data retained in at least one of the remote computing devices 614*a,b,c* can include the PMU data 134 or the PMU data 324, or both.

In another aspect, the user can enter commands and information into the computing device 601 via an input device (not shown). Examples of such input devices comprise, but are not limited to, a keyboard, pointing device (e.g., a "mouse"), a microphone, a joystick, a scanner, tactile input devices such as gloves, and other body coverings, and the like These and other input devices can be connected to the one or more processors 603 via the human-machine interface 602 that is coupled to the system bus 613, but can be connected by other interface and bus structures, such as a parallel port, game port, an IEEE 1394 Port (also known as a Firewire port), a serial port, or a universal serial bus (USB).

In yet another aspect, the display device 611 can also be connected to the system bus 613 via an interface, such as the display adapter 609. It is contemplated that the computing device 601 can have more than one display adapter 609 and the computing device 601 can have more than one display device 611. For example, the display device 611 can be a monitor, an LCD (Liquid Crystal Display), or a projector. In addition to the display device 611, other output peripheral devices can comprise components such as speakers (not shown) and a printer (not shown) which can be connected to the computing device 601 via the Input/Output Interface 610. Any operation and/or result of the methods can be output in any form to an output device. Such output can be any form of visual representation, including, but not limited to, textual, graphical, animation, audio, tactile, and the like. The display device 611 and computing device 601 can be part of one device, or separate devices.

The computing device 601 can operate in a networked environment using logical connections to one or more remote computing devices 614*a,b,c*. By way of example, a remote computing device can be a personal computer, portable computer, smartphone, a server, a router, a network computer, a peer device or other common network node, and so on. Logical connections between the computing device 601 and a remote computing device 614*a,b,c* can be made via a network 615, such as a local area network (LAN) and/or a general wide area network (WAN). Such network connections can be through the network adapter 608. The network adapter 608 can be implemented in both wired and wireless environments. In an aspect, one or more of the remote computing devices 614*a,b,c* can comprise an external engine and/or an interface to the external engine.

For purposes of illustration, application programs and other executable program components such as the operating system 605 are illustrated herein as discrete blocks, although it is recognized that such programs and components reside at various times in different storage components of the computing device 601, and are executed by the one or more processors 603 of the computer. An implementation of the software 606 can be stored on or transmitted across some form of computer-readable media. Any of the disclosed methods can be performed by computer readable instructions embodied on computer-readable media. Computer-readable media can be any available media that can be accessed by a computer. By way of example and not meant to be limiting, computer-readable media can comprise "computer storage media" and "communications media." "Computer storage media" comprise volatile and non-volatile, removable and non-removable media implemented in any methods or technology for storage of information such as computer-readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

It is to be understood that the methods and systems described here are not limited to specific operations, processes, components, or structure described, or to the order or particular combination of such operations or components as described. It is also to be understood that the terminology used herein is for the purpose of describing exemplary embodiments only and is not intended to be restrictive or limiting.

As used herein the singular forms "a," "an," and "the" include both singular and plural referents unless the context clearly dictates otherwise. Values expressed as approximations, by use of antecedents such as "about" or "approximately," shall include reasonable variations from the referenced values. If such approximate values are included with ranges, not only are the endpoints considered approximations, the magnitude of the range shall also be considered an approximation. Lists are to be considered exemplary and not restricted or limited to the elements comprising the list or to the order in which the elements have been listed unless the context clearly dictates otherwise.

Throughout the specification and claims of this disclosure, the following words have the meaning that is set forth: "comprise" and variations of the word, such as "comprising" and "comprises," mean including but not limited to, and are not intended to exclude, for example, other additives, components, integers, or operations. "Include" and variations of the word, such as "including" are not intended to mean something that is restricted or limited to what is indicated as being included, or to exclude what is not indicated. "May" means something that is permissive but not restrictive or limiting. "Optional" or "optionally" means something that may or may not be included without changing the result or what is being described. "Prefer" and variations of the word such as "preferred" or "preferably" mean something that is exemplary and more ideal, but not required. "Such as" means something that serves simply as an example.

Operations and components described herein as being used to perform the disclosed methods and construct the disclosed systems are illustrative unless the context clearly dictates otherwise. It is to be understood that when combinations, subsets, interactions, groups, etc. of these operations and components are disclosed, that while specific reference of each various individual and collective combinations and permutation of these may not be explicitly disclosed, each is specifically contemplated and described herein, for all methods and systems. This applies to all aspects of this application including, but not limited to, operations in disclosed methods and/or the components disclosed in the systems. Thus, if there are a variety of additional operations that can be performed or components that can be added, it is understood that each of these additional operations can be performed and components added with any specific embodiment or combination of embodiments of the disclosed systems and methods.

Embodiments of this disclosure may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices, whether internal, networked, or cloud-based.

Embodiments of this disclosure have been described with reference to diagrams, flowcharts, and other illustrations of computer-implemented methods, systems, apparatuses, and computer program products. Each block of the block diagrams and flowchart illustrations, and combinations of blocks in the block diagrams and flowchart illustrations, respectively, can be implemented by processor-accessible instructions. Such instructions can include, for example, computer program instructions (e.g., processor-readable and/or processor-executable instructions). The processor-accessible instructions can be built (e.g., linked and compiled) and retained in processor-executable form in one or multiple memory devices or one or many other processor-accessible non-transitory storage media. These computer program instructions (built or otherwise) may be loaded onto a general-purpose computer, special purpose computer, or other programmable data processing apparatus to produce a machine. The loaded computer program instructions can be accessed and executed by one or multiple processors or other types of processing circuitry. In response to execution, the loaded computer program instructions provide the functionality described in connection with flowchart blocks (individually or in a particular combination) or blocks in block diagrams (individually or in a particular combination). Thus, such instructions which execute on the computer or other programmable data processing apparatus create a means for implementing the functions specified in the flowchart blocks (individually or in a particular combination) or blocks in block diagrams (individually or in a particular combination).

These computer program instructions may also be stored in a computer-readable memory that can direct a computer or other programmable data processing apparatus to function in a particular manner, such that the instructions stored in the computer-readable memory produce an article of manufacture including processor-accessible instruction (e.g., processor-readable instructions and/or processor-executable instructions) to implement the function specified in the flowchart blocks (individually or in a particular combination) or blocks in block diagrams (individually or in a particular combination). The computer program instructions (built or otherwise) may also be loaded onto a computer or other programmable data processing apparatus to cause a series of operations to be performed on the computer or other programmable apparatus to produce a computer-implemented process. The series of operations can be performed in response to execution by one or more processor or other types of processing circuitry. Thus, such instructions that execute on the computer or other programmable apparatus provide operations for implementing the functions specified in the flowchart blocks (individually or in a particular combination) or blocks in block diagrams (individually or in a particular combination).

Accordingly, blocks of the block diagrams and flowchart illustrations support combinations of means for performing the specified functions in connection with such diagrams and/or flowchart illustrations, combinations of operations for performing the specified functions and program instruction means for performing the specified functions. Each block of the block diagrams and flowchart illustrations, and combinations of blocks in the block diagrams and flowchart illustrations, can be implemented by special purpose hardware-based computer systems that perform the specified functions or operations, or combinations of special purpose hardware and computer instructions.

The methods and systems can employ artificial intelligence techniques such as machine learning and iterative learning. Examples of such techniques include, but are not limited to, expert systems, case-based reasoning, Bayesian networks, behavior-based AI, neural networks, fuzzy systems, evolutionary computation (e.g. genetic algorithms), swarm intelligence (e.g. ant algorithms), and hybrid intelligent systems (e.g. expert inference rules generated through a neural network or production rules from statistical learning).

While the computer-implemented methods, apparatuses, devices, and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its operations be performed in a specific order. Accordingly, where a method claim does not actually recite an order to be followed by its operations or it is not otherwise specifically stated in the claims or descriptions that the operations are to be limited to a specific order, it is in no way intended that an order be inferred, in any respect. This holds for any possible non-express basis for interpretation, including: matters of logic with respect to arrangement of operations or operational flow; plain meaning derived from grammatical organization or punctuation; the number or type of embodiments described in the specification.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

What is claimed is:

1. A computer-implemented method comprising:

accessing phasor data associated with an electric power circuit including an arrangement of switching devices and multiple phasor measurement units;

determining, based on historical phasor data, a maximum value of current amplitude on the switching devices in an open state and a minimum value of current amplitude on the switching devices in a closed state;

determining, based on the maximum value of current amplitude and the minimum value of current amplitude, individualized zero-current thresholds for the multiple phasor measurement units;

determining one or more zero-current branches present in the arrangement of switching devices by applying the individualized zero-current thresholds to the phasor data; and determining, based on the one or more zero-current branches, a circuit topology by selectively opening and closing the arrangement of switching devices.

2. The computer-implemented method of claim 1, wherein the accessing comprises receiving data from each phasor measurement unit of the multiple phasor measurement units.

3. The computer-implemented method of claim 1, wherein the determining the one or more zero-current branches comprises determining that a value of current amplitude at a first phasor measurement unit of the multiple phasor measurement units is less than an individualized zero-current threshold value configured for the first phasor measurement unit.

4. The computer-implemented method of claim 1, further comprising accessing the historical phasor data associated with the multiple phasor measurement units.

5. The computer-implemented method of claim 1, wherein determining, based on the maximum value of current amplitude and the minimum value of current amplitude, the individualized zero-current thresholds for the multiple phasor measurement units comprises, determining a value of a defined function of the maximum value of current amplitude and the minimum value of current amplitude; and configuring the value as an individualized zero-current threshold value for a predetermined phasor measurement unit.

6. The computer-implemented method of claim 4, wherein the accessing the historical phasor data comprises accessing historical field data corresponding to each phasor measurement unit of the multiple phasor measurement units.

7. The computer-implemented method of claim 4, wherein the accessing the historical phasor data comprises generating the phasor data by performing a simulation of time-dependent operation of the electric power circuit.

8. A computing device, comprising:

at least one processor; and at least one memory device having processor-executable instructions stored thereon that, in response to execution by the at least one processor, cause the computing device to:

access phasor data associated with an electric power circuit including an arrangement of switching devices and multiple phasor measurement units;

determine, based on historical phasor data, a maximum value of current amplitude on the switching devices in an open state and a minimum value of current amplitude on the switching devices in a closed state;

determine, based on the maximum value of current amplitude and the minimum value of current amplitude, individualized zero-current thresholds for the multiple phasor measurement units;

determine one or more zero-current branches present in the arrangement of switching devices by applying the individualized zero-current thresholds to the phasor data; and determine, based on the one or more zero-current branches, a circuit topology by selectively opening and closing the arrangement of switching devices.

9. The computing device of claim 8, wherein accessing the phasor data comprises receiving field data from each phasor measurement unit of the multiple phasor measurement units.

10. The computing device of claim 8, wherein determining the one or more zero-current branches comprises determining that a value of current amplitude at a first phasor measurement unit of the multiple phasor measurement units is less than an individualized zero-current threshold value configured for the first phasor measurement unit.

11. The computing device of claim 8, the at least one memory device having further processor-executable instructions stored thereon that in response to execution by the at least one processor further cause the computing device to access the historical phasor data associated with the multiple phasor measurement units.

12. The computing device of claim 8, wherein determining, based on the maximum value of current amplitude and the minimum value of current amplitude, the individualized zero-current thresholds for the multiple phasor measurement units comprises, determining a value of a defined function of the maximum value of current amplitude and the minimum value of current amplitude; and configuring the value as an individualized zero-current threshold value for a predetermined phasor measurement unit.

13. The computing device of claim 11, wherein accessing the historical phasor data comprises accessing historical field data corresponding to each phasor measurement unit of the multiple phasor measurement units.

14. The computing device of claim 11, wherein accessing the historical phasor data comprises generating the phasor data by performing a simulation of time-dependent operation of the electric power circuit.

15. At least one non-transitory computer-readable storage medium having processor-executable instructions stored thereon that, in response to execution, cause a computing system to:

access phasor data associated with an electric power circuit including an arrangement of switching devices and multiple phasor measurement units;

determine, based on historical phasor data, a maximum value of current amplitude on the switching devices in an open state and a minimum value of current amplitude on the switching devices in a closed state;

determine, based on the maximum value of current amplitude and the minimum value of current amplitude, individualized zero-current thresholds for the multiple phasor measurement units;

determine one or more zero-current branches present in the arrangement of switching devices by applying the individualized zero-current thresholds to the phasor data; and determine, based on the one or more zero-current branches, a circuit topology by selectively opening and closing the arrangement of switching devices.

16. The at least one non-transitory computer-readable storage medium of claim 15, wherein accessing the phasor data comprises receiving field data from each phasor measurement unit of the multiple phasor measurement units.

17. The at least one non-transitory computer-readable storage medium of claim 15, wherein determining the one or more zero-current branches comprises determining that a value of current amplitude at a first phasor measurement unit of the multiple phasor measurement units is less than an individualized zero-current threshold value configured for the first phasor measurement unit.

18. The at least one non-transitory computer-readable storage medium of claim 15, wherein the processor-executable instructions, in response to further execution, further cause the computing system to access the historical phasor data associated with the multiple phasor measurement units.

19. The at least one non-transitory computer-readable storage medium of claim 18, wherein accessing the historical phasor data comprises accessing historical observed data corresponding to each phasor measurement unit of the multiple phasor measurement units.

20. The at least one non-transitory computer-readable storage medium of claim 18, wherein accessing the historical phasor data comprises generating the phasor data by performing a simulation of time-dependent operation of the electric power circuit.

* * * * *